(12) United States Patent
Roh et al.

(10) Patent No.: US 6,700,336 B2
(45) Date of Patent: Mar. 2, 2004

(54) APPARATUS FOR SUPPLYING DEFLECTION POWER FOR USE IN A DISPLAY AND CONTROL METHOD THEREOF

(75) Inventors: Chung-Wook Roh, Yongin (KR); Jun-Hyun Yang, Suwon (KR); Young-Soo Kim, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/057,982

(22) Filed: Jan. 29, 2002

(65) Prior Publication Data

US 2002/0117979 A1 Aug. 29, 2002

(30) Foreign Application Priority Data

Feb. 24, 2001 (KR) .......................................... 2001-9512

(51) Int. Cl.[7] .................................................. G09G 1/04
(52) U.S. Cl. ........................................ 315/371; 396/408
(58) Field of Search ................................. 315/371, 408, 315/396

(56) References Cited

U.S. PATENT DOCUMENTS 5,550,442 A * 8/1996 Ueyama et al. ............. 315/371

* cited by examiner

Primary Examiner—David Vu
(74) Attorney, Agent, or Firm—Sughrue Mion, PLLC

(57) ABSTRACT

An apparatus for supplying a deflection power for use in a display and a control method thereof. The apparatus includes a high voltage outputting portion having a first coil connected to a rectifier and a second coil, coupled with the first coil, which outputs an induced voltage, a first switch installed between the rectifier and the first coil, for controlling a power supply, a second switch installed on a path formed from the first switch, the first coil, and the rectifier, for controlling the power supply, and a deflection electric current generator connected in parallel with the second switch, the deflection electric current generator having a series-connected deflection coil and capacitor.

7 Claims, 4 Drawing Sheets

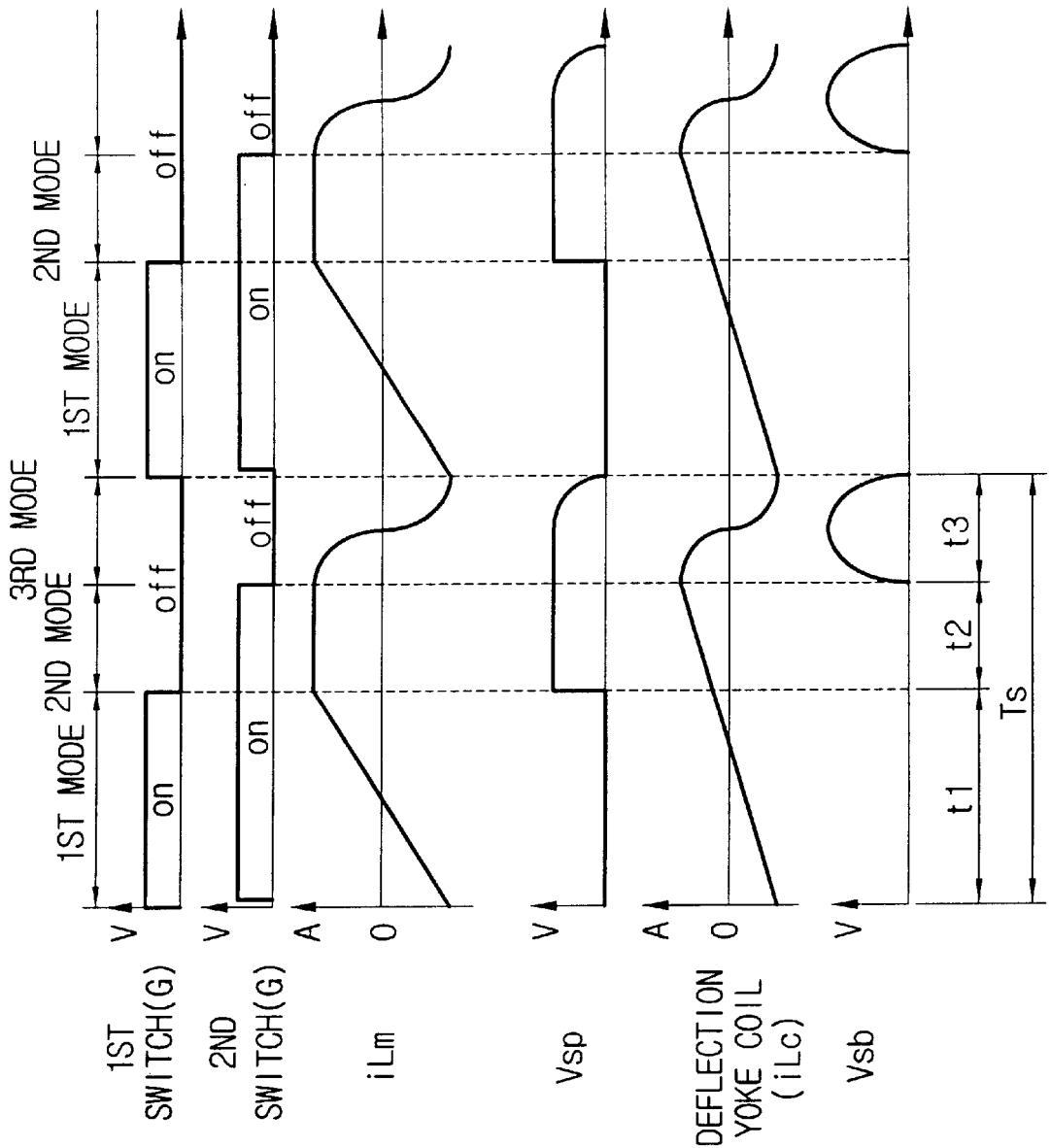

APPARATUS FOR SUPPLYING DEFLECTION POWER FOR USE IN A DISPLAY AND CONTROL METHOD THEREOF

BACKGROUND OF THE INVENTION

1. Field of the Invention

The present invention relates to a deflection power supplying apparatus for use in a display and a control method thereof, and more particularly to a deflection power supplying apparatus for use in a display capable of lowering a switching loss and a control method thereof. The present application is based on Korean Application No. 2001-9512, filed Feb. 24, 2001.

2. Description of the Related Art

FIG. 1 shows a circuit diagram showing a conventional deflection power supplying apparatus.

Referring to FIG. 1, the deflection power supplying apparatus includes a rectifying portion 11, a pulse width modulation controlling portion (PWM controlling portion; 13), a first transformer 15, a LC filtering portion 17, a second transformer 19, and a horizontal driver 23.

A first switch 12 is installed to control a power supply to a first coil of the first transformer 15 with the PWM controlling portion 13. Connected in parallel with the first switch 12, a capacitor 14 is aimed to generate resonance in association with the first coil of the first transformer 15. More specifically, the capacitor restricts an increase of voltage at both ends of the first switch 12 at the time of turning off of the first switch 12, and lowers switching loss at the time the first switch 12 is turned on.

A first coil of the second transformer 19 is connected to a second coil of the first transformer 15 to form an electric current loop, while the second coil is connected to a rectifying element to output a high voltage generated by a winding ratio.

Installed on the electric current loop connected between the first coil of the second transformer 19 and the second coil of the first transformer 15, the second switch 25 is switched on/off by a horizontal driver 23.

A deflecting coil 21, called a deflection yoke, is connected in parallel with the second switch 25 to form electric loop.

The element designated by a reference symbol S.R is an inductor for suppressing a parasitic component.

The deflection power supplying apparatus described above is generally called a pseudo-resonant flyback converter. In the deflection power supplying apparatus, electric current is applied to the first transformer 15 in a discontinuous current mode, and the maximum electric current at the first switch 12 is increased to more than twice the value of a normal load electric current. Further, since the maximum value of the switching voltage at the first switch 12 is the result of adding output voltage of input voltage at the first coil, switching stress is increased, deteriorating power transfer efficiency.

Additionally, due to the considerable number of components, the structure becomes complicated. Also, since the switches are driven by the variable-frequency method, it is difficult to design the LC filter 17 in order to improve filtering capability.

FIG. 2 is a circuit diagram showing a conventional deflection power supplying apparatus according to another method.

Referring to FIG. 2, the deflection power supplying apparatus includes a rectifying portion 31, a pulse width modulation controlling portion (PWM controlling portion; 33), a LC filter 37, a high voltage transformer 39, and a horizontal driver 43.

A first switch 32 is installed to control a power supply from the rectifying portion 31 to a first coil of the high voltage transformer 39 with the PWM controlling portion 33.

The LC filter 37 is connected between the first switch 32 and the first coil of the high voltage transformer 39, to suppress noise input through the first switch 32 and noise directed from the high voltage transformer 39 to the rectifying portion 31.

The second coil of the high voltage transformer 39 is connected to the rectifying element, to thereby output high voltage generated by the winding ratio.

The second switch 45 is installed on the electric current path connected from the first coil of the high voltage transformer 39 to the rectifying portion 31, and switched on/off by the horizontal driver 43.

The deflecting coil 41 is connected in parallel with the second switch 45 to form an electric current loop.

The deflection power supplying apparatus as described above is generally called a buck converter. The operation of the buck converter will be described below.

The PWM controlling portion 33 controls duty, a ratio of the interval, where the first switch 32 is driven on, with respect to the driving period, according to required electricity supply, and drives on/off the first switch 32.

The maximum electric current input through the first switch 32 is determined as a normal load electric current driven in a continuous current mode, and the maximum voltage at both ends of the first switch 32 are determined as input voltage.

The high voltage transformer 39 induces energy stored at the first coil through the LC filter 37 for smoothing and noise removal to the second coil by the flyback method, generating high voltage. The energy, induced at the second coil of the high voltage transformer 39, is output as high voltage for thermal electron emission.

The horizontal driver 43 regularly drives on/off the second switch 45 in accordance with the frequency of the horizontal sync signal. While the second switch 45 is turned on, energy is stored at the first coil of the high voltage transformer 39, and the deflecting coil 41 generates the electric current required for horizontal scanning of a screen. While the second switch 45 is turned off, the energy stored at the first coil of the high voltage transformer 39 is transmitted to the second coil, and the deflecting coil 41 generates retrace electric current that is required to emit a beam to a horizontal scanning upper end.

Since the deflection power supplying apparatus as described above, however, can not share the functions of some elements, the structure becomes complicated. Further, when the energy stored at the first coil of the high voltage transformer 39 flows toward the LC filter 37, i.e., when the energy flows in the reverse direction during the time the first and the second switches 32 and 45 are switched off altogether, energy is almost charged through the capacitor 37a. As a result, switching loss occurs when the first switch 32 is turned on, and it is hard to control the generation of the switching noise.

SUMMARY OF THE INVENTION

The present invention has been made to overcome the above-mentioned problems of the related art, and accordingly, it is an object of the present invention to provide a deflection power supplying apparatus for use in a display and a control method thereof capable of simplifying a structure for supplying deflection electric current and also lowering switching loss.

The above object is accomplished by an apparatus for supplying a deflection power for use in a display in accordance with the present invention, including a rectifying portion for rectifying an alternating electric current into a direct electric current, a high voltage outputting portion having a first coil connected on an output path of a voltage rectified by the rectifying portion and a second coil coupled with the first coil, the high voltage outputting portion for outputting a voltage induced at the second coil, a first switching portion installed between the rectifying portion and the first coil, for controlling a power supply, a second switching portion installed on a path formed from the first switching portion, the first coil, and the rectifying portion, for controlling the power supply, and a deflection electric current generating portion forming a loop of electric current in parallel in association with both ends of the second switching portion, the deflection electric current generating portion connected in series with a deflection coil and a capacitor.

The high voltage outputting portion includes a diode, an anode of which being connected to one end of the second coil, and a capacitor connected between a cathode of the diode and the other end of the second coil.

Further, the deflection power supplying apparatus includes a diode and a capacitor connected in parallel with the both ends of the second switching portion.

Preferably, the deflection power supplying apparatus includes a free wheeling diode having one end connected between the first switching portion and the first coil and the other end connected to the end of the rectifying portion which is not connected to the first switching portion.

A main controlling portion controls the first switching portion and the second switching portion such that the first switching portion is turned on almost simultaneously with the second switching portion, and the second switching portion is driven on/off in accordance with a horizontal deflection frequency of the display.

The main controlling portion controls the switching portions to sequentially repeat a cycle of a first mode, a second mode, and a third mode, the first mode in which the first switching portion and the second switching portion are turned on in accordance with a horizontal sync signal almost simultaneously, the second mode in which the first switching portion is turned off while the second switching portion remains in an off state, and the third mode in which the first switching portion and the second switching portion are turned off.

The above object is also accomplished by a method of driving an apparatus for supplying deflection power in accordance with the present invention, including the steps of almost simultaneously turning on the first switching portion and the second switching portion in accordance with a horizontal sync signal, turning off the first switching portion, while keeping the second switching portion in an on state, turning off the first switching portion and the second switching portion, and repeating the above three steps at least once.

BRIEF DESCRIPTION OF THE DRAWINGS

The above-mentioned objects and the features of the present invention will be more apparent by describing the preferred embodiment of the present invention in detail referring to the appended drawings, in which

FIG. 4 is a waveform chart for explaining the operation of the deflection power supplying apparatus of FIG. 3.

DETAILED DESCRIPTION OF PREFERRED EMBODIMENT

Detailed description according to the preferred embodiment of the present invention will follow referring to the attached drawings.

Figure 1:
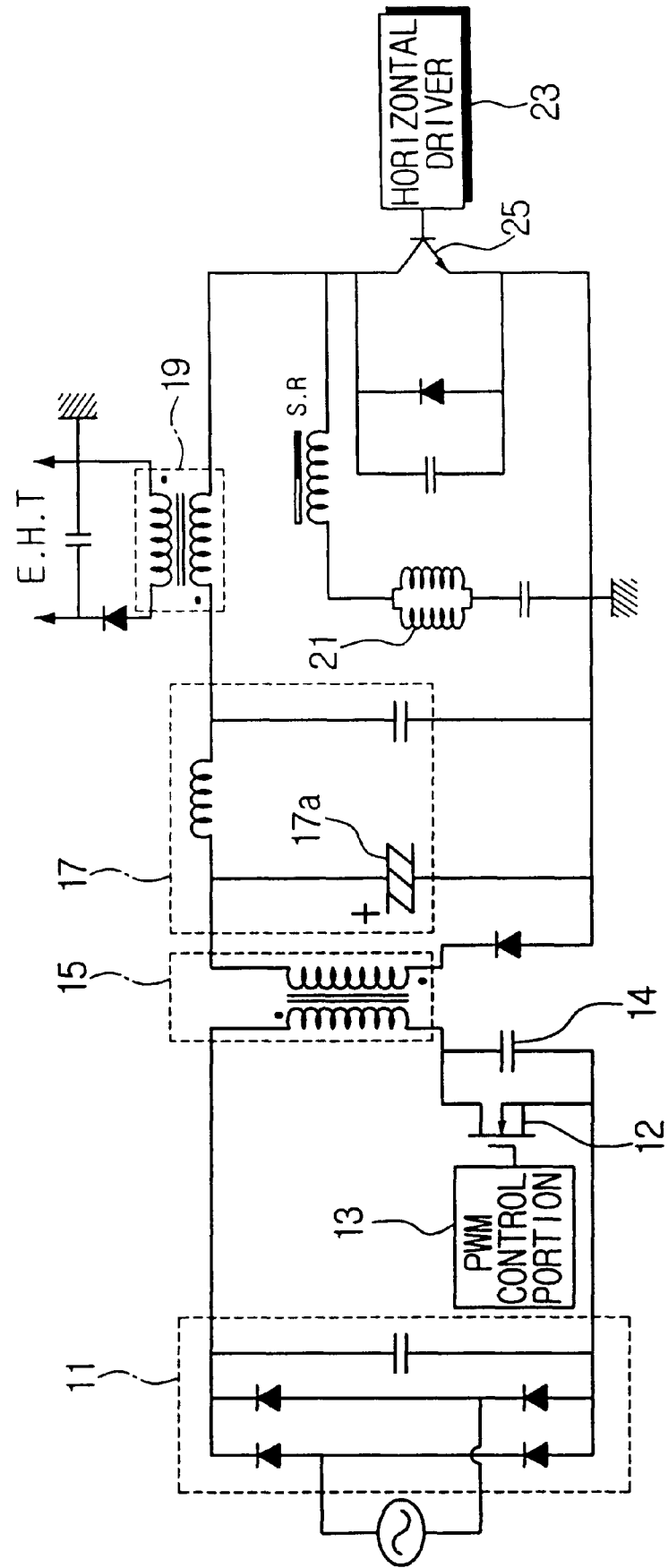
FIG. 1 is a circuit diagram showing a conventional deflection power supplying apparatus.
Figure 2:
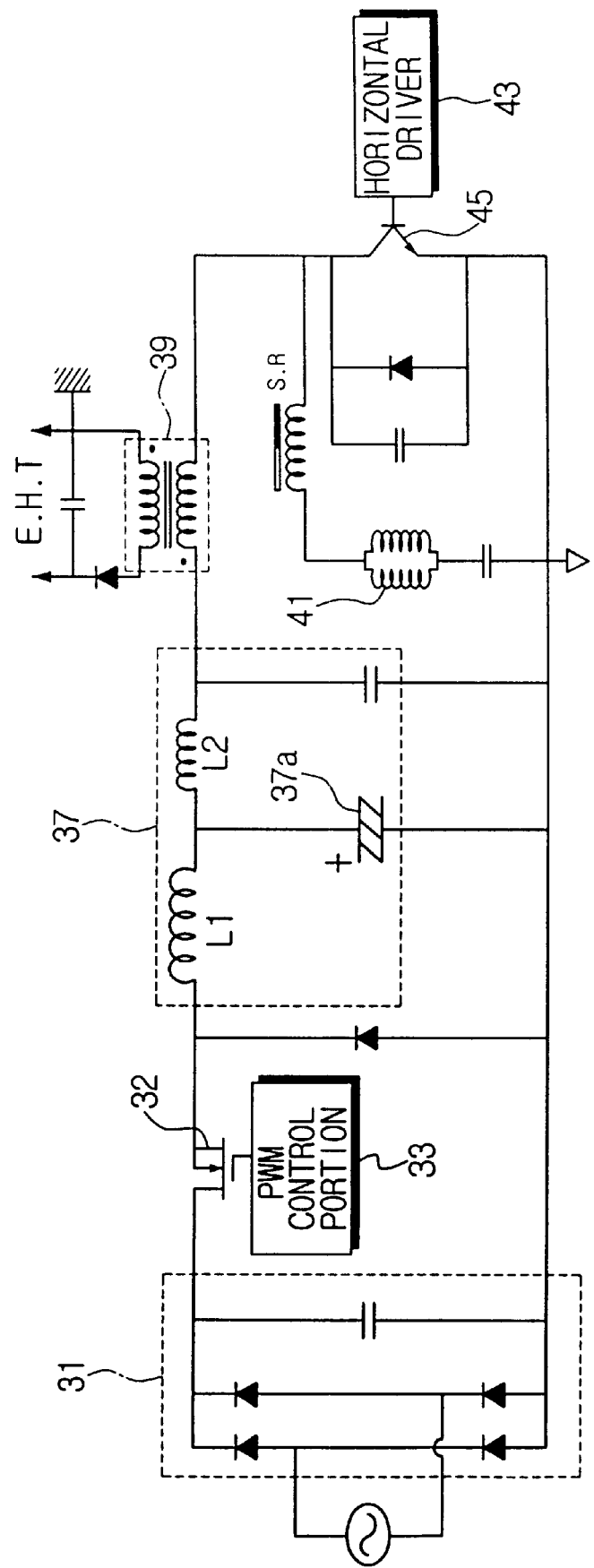
FIG. 2 is a circuit diagram showing another conventional deflection power supplying apparatus.
Figure 3:
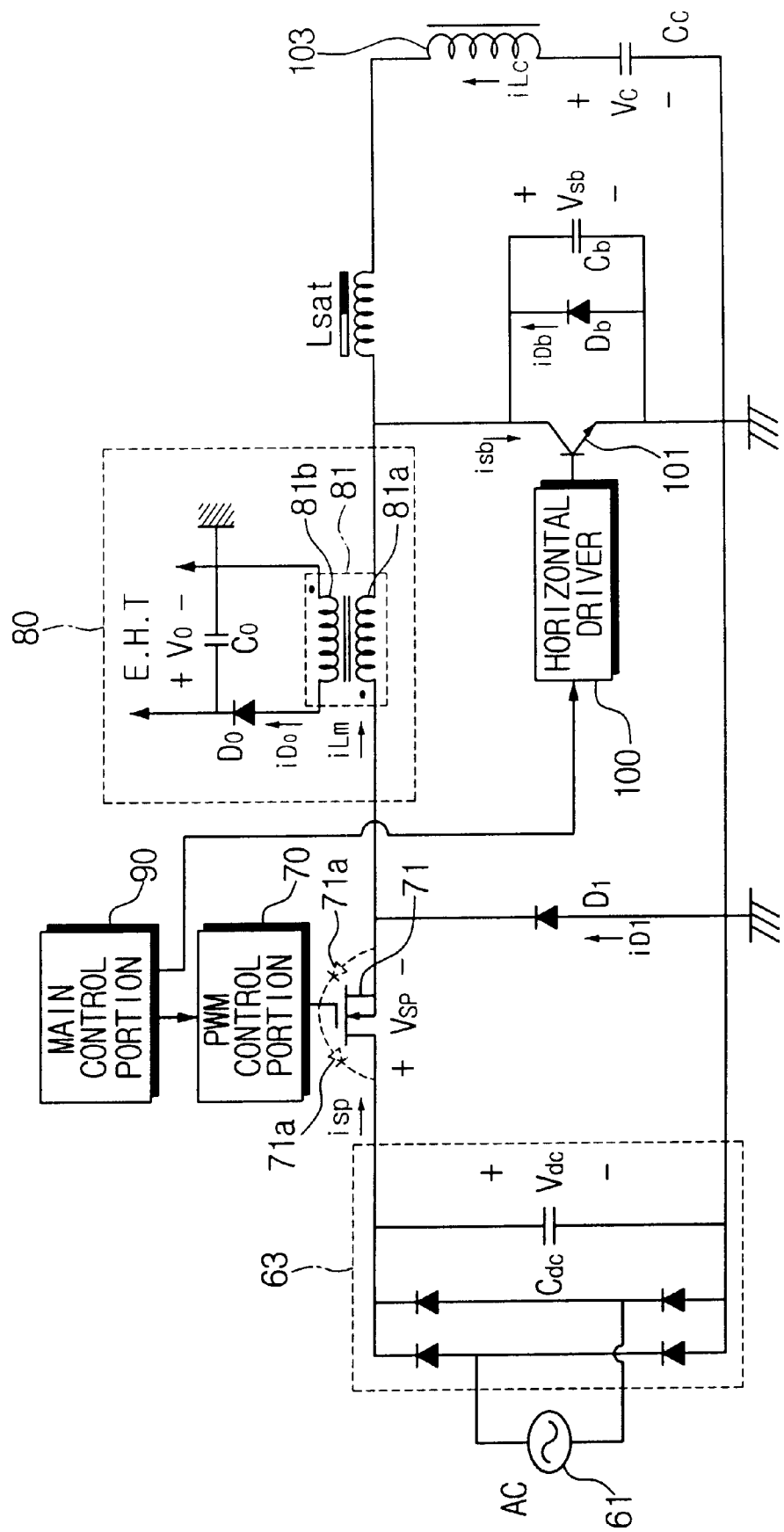
FIG. 3 is a circuit diagram showing a deflection power supplying apparatus in accordance with a preferred embodiment of the present invention.

FIG. 3 is a circuit diagram showing a deflection power supplying apparatus for use in a display in accordance with the preferred embodiment of the present invention.

Referring to FIG. 3, the deflection power supplying apparatus includes a rectifying portion 63, a pulse width modulation controlling portion (PWM controlling portion; 70), a high voltage outputting portion 80, and a horizontal driver 100.

Here, the display may be, for example, a CRT monitor or a television.

The rectifying portion 63 rectifies an AC voltage input from a commonly used AC voltage 61 into a DC voltage. The voltage, rectified through a bridge diode of the rectifying portion 63, is charged in a capacitor (Cdc).

The first switching portion includes a first switch 71, and the PWM controlling portion 70 for controlling turning on/off of the first switch 71.

The PWM controlling portion 70 varies the duty, which is the driving-on period divided by the driving period of the first switch 71, in accordance with the required electricity supply, and drives on/off the first switch 71.

The high voltage outputting portion 80 includes the high voltage transformer 81 and the rectifying portion.

The first coil 81a of the high voltage transformer 81 is connected to a loop through which electric current, supplied from the rectifying portion 63 through the first switch feeds back to the rectifying portion 63.

The first and the second coils 81a and 81b of the high voltage transformer 81 are wound in an opposite direction from each other. The voltage induced at the second coil 81b is rectified and smoothed by a diode Do and a capacitor Co as a rectifying portion, and the voltage Vo charged at the capacitor Co is supplied to an electronic high tension (E.H.T.), which is a high voltage supplying part used for thermal electron emission.

A free wheeling diode D1 is installed with one end connected between the first switch 71 and the first coil 81a and the other end connected to ground.

The second switching portion includes a second switch 101 and a horizontal driver 100.

The horizontal driver 100 drives on/off the second switch 101 in accordance with the frequency of the horizontal sync signal.

Both ends of the second switch 101 are connected in parallel with the diode Db and the capacitor Cb, respectively.

Further, both ends of the second switch 101 are connected in parallel with a series connection of an inductor Lsat, a deflecting coil 103, and a capacitor Cc.

The inductor Lsat removes the parasitic component.

A main controlling portion 90 controls the PWM controlling portion 70 and the horizontal driver 100 so that the turning-on time of the first switch 71 nearly coincides with the turning-on time of the second switch 101. The simultaneous turning-on of the first and the second switches 71 and 101 is determined by the horizontal sync signal of the image data.

Preferably, the main controlling portion 90 repeats the following three modes sequentially: in the first mode, the first and the second switches 71 and 101 are either switched on simultaneously in accordance with the horizontal sync signal and kept on for a predetermined time, or the second switch is switched on slightly later than the first switch. In the second mode, the first switch 71 is switched off and the second switch 101 is switched on for a predetermined time. In the third mode, both the first and the second switches 71 and 101 are switched off for a predetermined time. In other words, the first, the second, and the third modes constitute one cycle. Here, the first mode period is variable in accordance with the duty applied to the first switch 71.

The operation of the deflection power supplying apparatus as described above will be described in greater detail with reference to FIG. 4.

A reference symbol Ts refers to a cycle of first through third modes, which corresponds to 62.5 μs in the NTSC system.

In the first mode, the first switch 71 is switched on almost simultaneously with the second switch 101. The second switch 101 may be switched on slightly later than the first switch 71. The first mode is an interval where the electricity is supplied from the rectifying portion 63, and at the same time, the deflection electric current is supplied for horizontal scanning from the perspective of the deflection coil 103.

During a period (t1) of the first mode, energy charged in the rectifying portion 63 is supplied to the first coil 81a through the first switch 71. Further, during the first mode, a diode Do connected with the second coil 81b and a free wheeling diode D1 are operated in a state that the electricity is cut off.

During the first mode, in an interval where the negative (−) electric current (iLm) flows from the first coil 81a (hatched region), the electric current flows through a body diode 71a, which is a parasitic component, and the diode Db connected in parallel with the second switch 101, the first switch 71 being represented by an equivalent circuit. Further, during the first mode, in an interval where the positive (+) electric current iLm flowing to the first coil 81a, the electric current flows through the first and the second switches 71 and 101.

The electric current iLm flowing through the first coil 81a increases with a slope represented by Vdc/Lm (i.e., the inductance value of the first coil).

The deflection electric current iLc flowing through the deflection coil 103 increases from a negative value with a slope represented by Vc/Lc by a charged voltage Vc of the capacitor Cc.

Meanwhile, in the second mode where the first switch 71 is turned off and the second switch 101 remains in the on state, the electricity supply from the rectifying portion 63 is cut off.

A period (t2) of the second mode is an interval where the electricity is wheeling from a view of the rectifying portion 63, and at the same time, an interval where the deflection electric current is supplied for horizontal scanning as in the first mode from a view of the deflection coil 103.

In the second mode, the free wheeling diode D1 is turned on, and deflection electric current is continuously supplied to the deflection coil 103 for horizontal scanning. At this time, the amount of electric current iLm flowing in the first coil 81a is maintained constant. During the second mode, the deflection electric current iLc keeps increasing at a slope represented by Vc/Lc. The voltage Vdc of the rectifying portion 63 is applied across the switch 71, which is turned off.

In the third mode (period of t3), both of the first and the second switches 71 and 101 are turned off.

During the third mode, the electricity supply from the rectifying portion 63 remains in the cut-off state, and the electricity is wheeling by the turning on of the free wheeling diode D1. Further, during the third mode the retrace deflection electric current is supplied for a horizontal retrace.

More specifically, when the second switch 101 is turned off, resonance occurs through a resonant path of D1→first coil 81a→Cb. Next, the voltage Vsb across the second switch 101 increases gradually, and the electric current iLm flowing to the first coil 81a decreases. Next, when the voltage Vsb at both ends of the second switch 101 reaches a maximum determined by the voltage Vdc charged at the rectifying portion 63 and the winding ratio of the high voltage transformer, the diode Do connected to the second coil 81b is turned on. After that, when the electricity to the diode Do is cut off by the discharging energy induced at the second coil 81b, resonance occurs again, and the voltage Vsb across the second switch 101 keeps decreasing. In this process, the electric current input to the first coil 81a becomes negative, and resonance ceases when the voltage Vsb across the second switch 101 becomes zero.

After the voltage Vsb across the second switch 101 becomes zero (0), operation returns to the first mode in which the first and the second switches 71 and 101 are turned on. By the return to the first mode, the electric current iLm at the first coil 81a has become negative (−), and energy stored at a parasitic capacitor (not shown) of the first switch 71 is fed back to the rectifying portion 63, and as the voltage across the second switch 101 becomes zero, the voltage across the first switch 71 almost simultaneously becomes zero, turning on the first switch 71, thereby performing a zero-voltage switching. At this time, at the deflection coil 103, through the resonant path connected through the capacitor Cc, deflection coil 103, and the capacitor Cb, the deflection electric current changes from positive (+) to negative (−).

Accordingly, there is almost no switching loss at the first switch 71.

As described above, with the apparatus for supplying deflection power for use in a display and a control method thereof in accordance with the present invention, a simplified structure is achieved, and switching loss is decreased. As a result, power converting efficiency is improved. That is, compared to the conventional apparatus, a smoothing capacitor for filtering and an inductor are omitted, and noise due to voltage variation is reduced by adding the capacitor, a no-loss snubber, across the second switch 101. Further, since there is no influence by the parasitic capacitance of the second switch 101, difficulty in selecting an element can be lessened. Further, since the apparatus is operated as a buck converter, stress of the voltage and electric current of the element can be reduced.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. An apparatus for supplying deflection power for use in a display, comprising:
   a rectifying portion for rectifying an alternating electric current into a direct electric current;
   a high voltage outputting portion having a first coil connected on an output path of a voltage rectified by the rectifying portion and a second coil coupled with the first coil, wherein said high voltage outputting portion outputs a voltage induced at the second coil;
   a first switching portion installed between the rectifying portion and the first coil, for controlling a power supply;
   a second switching portion installed on a path formed from the first switching portion, the first coil, and the rectifying portion, for controlling the power supply;
   a deflection electric current generating portion, connected in parallel with said second switching portion and including a series connected deflection coil and first capacitor, for generating deflection electric current;and
   a main controlling portion for controlling the first switching portion and the second switching portion, the main controlling portion for driving the first and the second switching portions in a manner such that the first switching portion is turned on almost simultaneously with the second switching portion.

2. The deflection power supplying apparatus of claim 1, wherein the high voltage outputting portion comprises:
   a first diode having an anode connected to one end of the second coil; and
   a second capacitor connected between a cathode of the first diode and the other end of the second coil.

3. The deflection power supplying apparatus of claim 1, further comprising a second diode and a third capacitor connected in parallel with the second switching portion.

4. The deflection power supplying apparatus of claim 1, further comprising a free wheeling diode having one end connected between the first switching portion and the first coil and the other end connected to an end of the rectifying portion which is not connected to the first switching portion.

5. The deflection power supplying apparatus of claim 1, wherein the second switching portion is driven on/off in accordance with a horizontal deflection frequency of a display.

6. The deflection power supplying apparatus of claim 1, wherein the main controlling portion controls the first switching portion and the second switching portion to sequentially repeat a cycle of a first mode, a second mode, and a third mode, the first mode in which the first switching portion and the second switching portion are turned on in accordance with a horizontal sync signal almost simultaneously, the second mode in which the first switching portion is turned off while the second switching portion remains in an on state, and the third mode in which the first switching portion and the second switching portion are turned off.

7. A method of driving an apparatus for supplying a deflection power comprising a high voltage outputting portion for outputting a high voltage induced through a first coil connected to an output path of a voltage rectified by a rectifying portion, a first switching portion for controlling a power supply between the rectifying portion and the first coil, a second switching portion installed between the first switching portion to the first coil and to the rectifying portion, the second switching portion for controlling the power supply, a deflection electric current generating portion connected in parallel with the second switching portion, the deflection electric current generating portion having a deflection coil and a capacitor connected in series, and a free wheeling diode connected to in between the first switching portion and the first coil and to a feedback path to the rectifying portion, and a main controlling portion for controlling the first switching portion and the second switching portion, the main controlling portion for driving the first and the second switching portions in a manner such that the first switching portion is turned on almost simultaneously with the second switching portion, the method comprising the steps of:

A) almost simultaneously turning on the first switching portion and the second switching portion in accordance with a horizontal sync signal;
   B) turning off the first switching portion, while keeping the second switching portion in on state;
   C) turning off the first switching portion and the second switching portion; and
   D) repeating the steps A) through C) at least once.

* * * * *